WHEATSTONE BRIDGE HAVING STYLUS SHUNTING ONE ARM

Filed April 27, 1948

INVENTOR.
F. T. TURNER
BY [signature]
ATTORNEY

Patented Aug. 19, 1952 2,607,844

UNITED STATES PATENT OFFICE 2,607,844

WHEATSTONE BRIDGE HAVING STYLUS SHUNTING ONE ARM

Frank T. Turner, Hampton Bays, N. Y., assignor to The Western Union Telegraph Company, New York, N. Y., a corporation of New York Application April 27, 1948, Serial No. 23,534

5 Claims. (Cl. 178—5)

This invention relates to the art of telegraphic communication by facsimile transmission of subject matter marked on paper and the general object of the invention is to present novel keying circuits for a transmitter using an electric stylus for the scanning of the subject copy. These keying circuits are characterized by simplicity of structure and ease of adjustment for producing facsimile signals of maximum efficiency in the scanning of copy made by marks either of insulating or conducting material.

The basic feature of my invention comprises a bridge network capable of being balanced for transmitting facsimile signals from a sheet of paper (or like material) where the marked and unmarked areas offer different resistances in the stylus circuit. These resistance variations are measured from the stylus in contact with the scanned areas to another contact at the back of the paper. This back contact is usually the metal drum on which the sheet is mounted for scanning.

In one form of my invention I transmit from paper having a conductive base stock and a thin insulating surface on which the record is made in conducting marks or characters with a graphite pencil or similar implement. These pencil marks go through the top coating of the paper and make contact with the conducting base underneath. The stylus circuit is connected in one arm of the bridge network which is balanced when the stylus touches the unmarked surface of the paper. Whenever the stylus passes over a conducting mark the change in resistance unbalances the bridge which thereupon sends out corresponding signals to a transmission line connected with a facsimile recorder.

My novel keying circuit may also be employed for scanning a subject copy made with insulating marks on a conducting surface. In that case the bridge is balanced when the stylus touches the conducting background of the paper and is unbalanced when the stylus passes over an insulating mark.

Further, the bridge circuit of my invention may be adjusted for either positive or negative transmission. That is to say, the transmitted signals may represent either the marked or the unmarked areas of the paper, regardless of whether the marked areas are higher or lower in resistance than the unmarked areas. Thus, for positive transmission to produce a positive copy of the original message, the bridge is balanced when the stylus encounters the unmarked paper, so that signals are transmitted only when the stylus engages a mark on the paper. To produce a negative facsimile at the recorder, the bridge is balanced when the stylus operates on the marked areas, so that no signals are transmitted when the stylus scans a mark on the paper but only when the unmarked areas are scanned.

The foregoing and other novel features and practical advantages of my invention will be fully explained in the description of the accompanying drawings in which—

Figure 1:
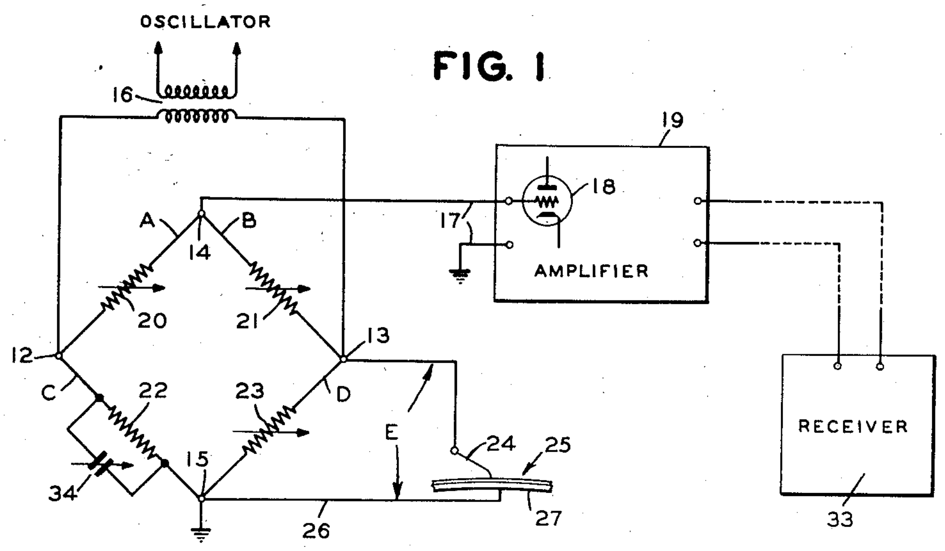
Fig. 1 is a circuit diagram of a facsimile transmission system embodying my invention.

Referring to Fig. 1 there is a bridge network comprising four arms marked A, B, C and D connected in bridge form. The input terminals of the bridge are shown at 12 and 13 and the output terminals are at 14 and 15. An oscillator represented diagrammatically by its output transformer 16 is connected to the input terminals 12 and 13, so that a carrier tone of certain frequency passes through the bridge arms. The output terminals 14 and 15 are connected by a line 17 which includes the grid of a vacuum tube 18 in a suitable amplifier 19. The grounded end of the cross connection 17 goes to the grounded terminal 15.

The form arms A to D of the bridge contain resistors 20 to 23, respectively, which are adjustable (all or some of them) to balance the bridge for certain scanning conditions as will presently be explained. The resistance 23 in arm D is shunted by the stylus circuit E which includes an electric stylus 24 connected to the output terminal 13, a copy sheet 25 scanned by the stylus and a connection 26 which goes to the grounded output terminal 15. In practice the ground connection 26 is the grounded metal cylinder 27 on which the copy sheet is mounted for scanning by the stylus 24. The resistance between the stylus 24 and the grounded contact 27 may be called the scanning resistance of the stylus circuit.

Figure 2:
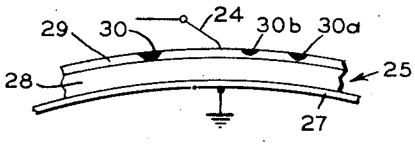
Fig. 2 shows a copy sheet having conducting marks made on an insulating surface, this view being in exaggerated diagrammatic form for clearness.

In Fig. 2 the copy sheet 25 consists of a conducting base 28 (such as carbon-impregnated paper) and a top coating 29 of a porous insulating material capable of being easily penetrated by the point of a conductive pencil. In other words, the marks made by a soft pencil of graphite will penetrate through the coating 29 either by removing the material or filling the pores thereof. Whichever way it happens, the pencil makes conductive marks or characters 30 which are in good contact with the conductive base 28 and the grounded cylinder or the back contact 27.

We are to understand, then, that the copy sheet of Fig. 2 consists of conducting marks made on an insulating surface. A mark that is properly made, like 30, is a good mark because it goes through to the conducting base 28 in good contact therewith. A fair mark is indicated at 30*a* which barely touches the conducting base 28, and a mark like 30*b* would be called a poor mark because it does not go deep enough. How poor, fair and good marks are dealt with by the bridge will be explained later.

Figure 3:
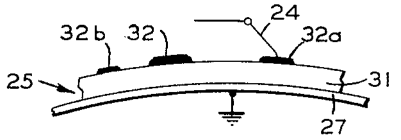
Fig. 3 shows a copy sheet which has insulating marks on a conducting surface.

In Fig. 3, the copy sheet consists of a conducting base stock 31 (usually carbon-impregnated paper) on which marks of insulating material are impressed, such marks being shown in an exaggerated way at 32, 32*a* and 32*b*. These marks may be of wax or a wax-like substance which can be transferred from the back of a paper sheet to the surface of base 31 by means of a pencil, typewriter or otherwise. We thus have here a conductive sheet with insulating marks, just the reverse of Fig. 2. Let it be understood that the marks 32, 32*a* and 32*b* are intended to represent good, fair and poor marks, respectively.

To understand the operation of the bridge network in transmitting facsimile signals to the amplifier 19, let us assume that the stylus 24 is scaning a copy like that in Fig. 2, with pencil marks on an insulating surface. It is clear that the scanning resistance is a maximum when the stylus touches the insulating surface or background 29 of the paper and is a minimum when the stylus engages a pencil mark.

For transmitting a positive copy the bridge is balanced when the stylus 24 engages the unmarked area 29, so that no difference of potential exists between the output terminals 14 and 15. Under those conditions no signals will pass to the grid of tube 18. However, when the stylus passes over a marked area, the scanning resistance is at a minimum, the bridge is unbalanced and signals are sent over the line 17 to the amplifier 19, which is operatively cennected with a suitable recorder 33. Thus, a positive facsimile of the original facsimile is produced. To get a negative copy at the recorder, the bridge is unbalanced and transmits signals at all times except when the stylus encounters a mark, whereupon no signals would be transmitted.

If the copy scanned in the transmitter is of the type shown in Fig. 3—that is, one with insulating marks on a conducting background—the bridge is balanced when the stylus engages the unmarked background 31 and is unbalanced when the stylus passes over an insulating mark. This gives a positive facsimile in the recorder. For a negative facsimile, the bridge is balanced only when the stylus rides over a waxed mark, so that no signals are transmitted during those intervals.

The method of balancing the bridge for any one of the conditions previously mentioned is a simple matter. It is only necessary to adjust one or more of the resistances 20 to 23 of the bridge arms to such values that the ratio of A:B equals the ratio of C:D. Since the arm D includes the stylus circuit which has a certain amount of capacity, it is desirable to include a balancing condenser 34 in the adjacent arm C. If the ratio of A:B is made unity, the only adjustment necessary is the value of the balancing resistance 22, whether the bridge is to be balanced for a marked or unmarked area of the copy sheet. When the bridge is balanced for an unmarked area or "space" condition of a copy sheet, like that in Fig. 2, the balancing resistance of arm C would actually be equal to resistor 23 in arm D, because the resistance of the paper in the unmarked areas is practically at infinity. A certain practical advantage is obtained by placing the resistor 23 of arm D in shunt to the stylus circuit E. In the copy paper used for this operation, it sometimes happens that different batches of paper will vary slightly in the thickness of their insulating top coating 29. This will cause corresponding variations in the electrical resistance of unmarked portions of the transmitted copy, and these resistance variations would normally tend to disturb the balance of the bridge. However, this tendency is minimized, if not entirely eliminated, by the stabilizing action of the shunt resistor 23, which renders the bridge less susceptible to resistance variations encountered by the stylus 24 when scanning the unmarked portions of the paper.

This stabilizing function of the shunt resistor 23 will be apparent if we consider the copy sheet of Fig. 2 in the stylus circuit of Fig. 1. Since the resistance of the paper in the unmarked areas is practically at infinity, as already stated, it follows that the resistor 23 is the principal factor in adjusting the other arms of the bridge for balance. Therefore, this balance is less susceptible to minor variations in the high resistance of the unmarked paper. At the same time, the scanning of a marked or low-resistance area of the paper still disturbs the balance of the bridge and produces an output voltage, as previously explained.

It will be understood from the preceding description that the bridge network of my invention can be used to produce signals for facsimile transmission from any suitable copy sheet where the marked and unmarked areas, when scanned by an electric stylus, produce resistance variations in the stylus circuit. The bridge is readily balanced for marked or unmarked conditions to produce either negative or positive transmission, as desired. Positive reproduction at the recorder is thus obtained without a separate signal inverter such as is necessary in prior facsimile systems. The unbalance voltage from the bridge may be impressed on the line through any suitable connections, either directly or through an amplifier.

As further showing the practical advantages of my novel bridge circuit for facsimile transmission, I would point out that it can be adjusted to improve the transmission of poor marks on a copy sheet. In the preparation of subject copy it is not to be expected that a person will make marks or characters of uniform density, whether using a pencil or a typewriter. Therefore, as already mentioned, a prepared copy sheet may have poor marks and fair marks mixed with good marks. A poor conducting mark, like 30*b* in Fig. 2, will offer considerably more resistance in the scanning circuit than a fair mark 30*a* or a good mark 30. In a copy like that shown in Fig. 3, the reverse is true, for there a good mark 32 offers most resistance, while a poor mark 32b offers least resistance.

It will be seen, therefore, that the effect of a poor mark in the transmission copy, whether the mark be of the insulating or conducting kind, is to produce a lower signal voltage than a good mark. Naturally, this lower voltage will cause the recording stylus to make a correspondingly poor facsimile mark. I overcome this objection by so adjusting the resistance values of the bridge arms that the bridge is not perfectly balanced and at all times transmits a fixed minimum value of signals for unmarked or "space" conditions. The effect of this constant minimum signal will be understood from a consideration of Figs. 4 and 5.

Figure 4:
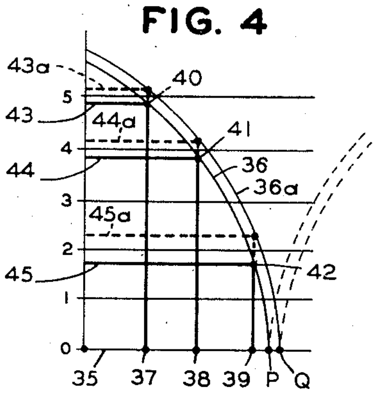
Fig. 4 is a graph illustrating the effect of maintaining a fixed minimum value of signal voltage in the bridge network when the stylus scans the copy shown in Fig. 2.

In the graph of Fig. 4, let the base line 35 represent the resistance of the stylus circuit, with points along that line indicating various resistance values from zero to infinity. Let the point P represent the resistance of the stylus circuit (that is, the resistance of bridge arm D) when the bridge is balanced for the unmarked areas of the copy sheet in Fig. 5. In other words, no difference of potential appears at the output terminals 14 and 15 while the stylus is in contact with the insulating surface 29 of the sheet.

The curve 36 which begins at point P and extends upward toward the left indicates roughly the output signal voltage of the bridge when it is unbalanced by the scanning of marks made on the insulating surface 29 of the copy sheet. Let the points 37, 38 and 39 designate resistance variations in the stylus circuit when the stylus scans, respectively, a good mark 30, a fair mark 30a and a poor mark 30b. The abscissae marked 1 to 5 and those in between represent voltage values of the bridge output under different conditions of unbalance.

When the stylus passes over a good mark like 30, the scanning resistance of bridge arm D is reduced to the point 37 and the ordinate of that point meets the curve 36 at 40. In like manner, the resistance points 38 and 39, due to the scanning of a fair mark 30a and a poor mark 30b, respectively, determine the points 41 and 42 on curve 36. Consequently, the abscissae 43, 44 and 45, drawn from points 40, 41 and 42, represent the different signal voltages of the bridge output for good marks, fair marks and poor marks, respectively. This simply means that a good mark produces the highest signal voltage and a poor mark the lowest.

Let us assume that in the graph of Fig. 4 the abscissa 2 indicates the minimum voltage required for recording. This minimum signal level is known as the threshold, below which no recording can take place. Now in Fig. 4, it will be seen that the abscissa 45 is below the threshold line 2, so that a poor mark like 30b (represented by the point 42) will not be recorded in the receiver 33. I overcome this objection in the following manner:

Instead of balancing the bridge for "space" or "mark" condition, the operator so adjusts the resistance arms A to D (one or more) that the bridge is slightly unbalanced to transmit a fixed minimum value of signal during the times when the stylus scans the background or unmarked top surface of the copy sheet, irrespective of whether that background is insulating (29 in Fig. 2) or conducting (31 in Fig. 3).

Suppose the bridge has been unbalanced for "space" conditions as in Fig. 4. This slightly unbalanced condition is represented by the point Q on the resistance line 35. The curve 36a drawn from the unbalance point Q now takes the place of curve 36 drawn from the balance point P. We now have the condition where the signal voltage due to the scanning of marks 30, 30a and 30b is represented by the abscissae 43a, 44a and 45a.

Therefore, the voltage now transmitted for a poor mark, as shown by abscissa 45a, is above the recording threshold 2 and the mark will be recorded by the stylus in receiver 33. While the recording voltage has also been raised for fair marks like 30a (abscissa 44a) and for good marks like 30 (abscissa 43a), it will be noticed that this voltage increase is proportionately less (it is negligible for a good mark) than the increase for a poor mark, which thus gets the most benefit of the normally unbalanced condition of the bridge.

Figure 5:
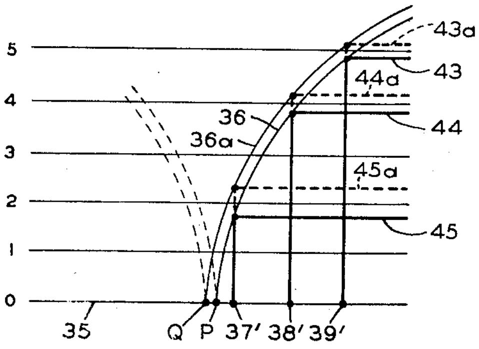
Fig. 5 is the equivalent of Fig. 4 when the stylus scans the copy shown in Fig. 3.

What has been said for Fig. 4 applies fully to the graph of Fig. 5 where the curves 36 and 36a extend to the right, that is in the direction of increasing resistance along the base line 35. This reversal of the graph lines is due to the fact that in Fig. 3, which goes with Fig. 5, the marks are of insulating material and a good mark like 32 offers the highest resistance (point 39'), a fair mark like 32a offers a lower resistance (point 38') and a poor mark like 32b offers the least resistance (point 37'). The dotted curves in Figs. 4 and 5 are merely intended to indicate that in both graphs we are operating from a null or balance point P with the unbalance point Q placed on one side or the other of point P, depending on whether the bridge is unbalanced for "space" of "mark" condition. This will be understood without further explanation.

The operation of my new bridge circuits for facsimile transmission by scanning with an electric stylus is not limited to any particular type or structure of copy sheet, it being only necessary that the marked and unmarked areas of the sheet have different resistances in the stylus circuit. Variations of the bridge circuits shown in Fig. 1 are possible within the scope of the appended claims.

I do not herein claim broadly the idea of transmitting facsimile signals from pencil marks made on a sheet like that shown in Fig. 2, nor from wax or similar marks made on a conducting sheet like that shown in Fig. 3. The particular form of copy sheet illustrated in Fig. 3 is the invention of Bernard L. Kline, as fully set forth in his Patent No. 2,572,871, issued October 30, 1951.

While for the purposes of discussion, it has been assumed that the elements 20, 21, 22, and 23 of bridge arms A, B, C, and D respectively are resistors, it is to be understood that any or all of them may be inductors or capacitors provided that the usual criteria for balancing of complex bridges are satisfied. Therefore, when I speak of the impedance of the bridge arms in the claims, I include not only ohmic resistance but reactance as well, whether inductive or capacitative.

I would add that when I use the term "paper" in the claims, I include not only paper as ordinarily understood but any other kind of flexible sheet-like material capable of receiving a record and suitable for scanning in facsimile apparatus.

I claim as my invention:

1. Facsimile transmission apparatus comprising an electric stylus for scanning a subject copy composed of two elements, namely, a sheet of paper and characters marked thereon, one of said elements having a high electric resistance and the other element having a relatively low resistance, a bridge network having carrier input terminals and signal output terminals, one arm of said bridge including the stylus and the subject copy so that said arm contains the scanning resistance of the stylus circuit, said last-mentioned bridge arm containing a resistor in shunt to the stylus circuit, another arm of said bridge containing a resistance element for balancing said resistor and scanning resistance, the impedance values of the bridge arms being adjustable to balance the bridge network at the output terminals when the stylus scans one of said copy elements, whereby the bridge is automatically unbalanced when the stylus scans the other copy element to produce facsimile signals at the output of the bridge, and means for transmtting said signals to a facsimile recorder.

2. Facsimile transmission apparatus comprising an electric stylus for scanning a sheet of paper having a conducting base and an insulating upper surface marked with conducting characters which penetrate to said base, a bridge network having carrier input terminals and signal output terminals, one arm of said bridge including the stylus and the marked sheet scanned thereby so that said arm contains the scanning resistance of the stylus circuit, said last mentioned arm containing a resistor in shunt to the stylus, another arm of said bridge containing a resistance element for balancing said scanning resistance, means for adjusting the impedance values of the bridge arms to balance the bridge at the output terminals when the stylus scans the insulating surface of said sheet, whereby the bridge is automatically unbalanced when the stylus scans said conducting characters to produce facsimile signals at the output terminals of the bridge, and connections for transmitting said signals to a facsimile recorder.

3. In the art of facsimile transmission by means of an electric stylus from subject copy having marks on a sheet of paper which differs in electric resistance from said marks, the method of intensifying the low signal voltage caused by the stylus contacting a poor mark which comprises connecting the stylus in a bridge network, deliberately unbalancing the bridge a predetermined amount prior to the start of transmission by adjusting the resistance value of at least one bridge arm so as to cause the normally unbalanced condition of the bridge to produce a fixed minimum voltage in a direction in which the output of the bridge is in phase with the output produced by the scanning of a mark, said minimum voltage being below the minimum recording level so that the low signal voltage caused by a poor mark is augmented by said minimum voltage, and transmitting said augmented signal voltage to a recorder.

4. Facsimile transmission apparatus comprising an electric stylus for scanning a sheet of paper having marked and unmarked areas of different electric resistances, a bridge network having carrier input terminals and signal output terminals, connections for including said stylus and marked sheet in a bridge arm of said network, the impedance values of said network being so adjusted that the network is slightly unbalanced at all times to transmit a fixed minimum value of voltage when the stylus passes over the unmarked areas of the sheet, said minimum voltage being below the minimum recording level, whereby the normally unbalanced condition of the network is increased when the stylus passes over a marked area of the sheet to produce signals of recording voltage at the output terminals of the network, the shape of the voltage curves being such that said minimum signal voltage causes the recording voltage for poor marks to be increased to a greater degree than the voltage for good marks, and connections for transmitting said signals to a facsimile recorder.

5. Facsimile transmission apparatus having an electric stylus for scanning subject copy composed of two elements, namely, a sheet of paper and characters marked thereon, one of said elements having a high electric resistance and the other element a relatively low resistance, a signal transmitting network comprising two pairs of arms connected to form a bridge and containing impedance elements, two opposite junction points of said arms constituting the output terminals of an oscillator, a cross-connection between said two pairs of arms at points of equal potential when the bridge is balanced, said cross-connection including the grid of an amplifier tube, at least one of said impedance elements being adjustable to produce a balanced condition of the bridge when the stylus is scanning one of said copy elements, and a circuit containing said stylus and subject copy connected in shunt to an impedance element in one arm of said bridge so that variations in the resistance of the stylus circuit when the stylus scans the other copy element unbalances the bridge and creates a signal voltage in said cross-connection.

FRANK T. TURNER.

REFERENCES CITED

The following references are of record in the file of this patent:

UNITED STATES PATENTS

| Number | Name | Date |
|---|---|---|
| 1,739,005 | Karolus | Dec. 10, 1929 |
| 1,985,084 | Fulton | Dec. 18, 1934 |
| 2,034,162 | Tweed | Mar. 17, 1936 |
| 2,050,737 | Schriever | Aug. 11, 1936 |
| 2,085,205 | Warncke | June 29, 1937 |

FOREIGN PATENTS

| Number | Country | Date |
|---|---|---|
| 533,915 | Germany | Mar. 3, 1929 |